United States Patent
Tsai

(10) Patent No.: US 11,046,379 B2
(45) Date of Patent: Jun. 29, 2021

(54) ANTI-RAPID DROP BICYCLE RACK AND ITS ANTI-RAPID DROP JOINT

(71) Applicant: JYIN SHENG CO., LTD., Huatan Township, Changhua County (TW)

(72) Inventor: Yu-Lung Tsai, Huatan Township, Changhua County (TW)

(73) Assignee: JYIN SHENG CO., LTD., Huatan Township, Changhua County (TW)

( * ) Notice: Subject to any disclaimer, the term of this patent is extended or adjusted under 35 U.S.C. 154(b) by 38 days.

(21) Appl. No.: 16/510,218

(22) Filed: Jul. 12, 2019

(65) Prior Publication Data

US 2021/0009223 A1   Jan. 14, 2021

(51) Int. Cl.
*B62H 3/00* (2006.01)
*B60R 9/10* (2006.01)

(52) U.S. Cl.
CPC ............. *B62H 3/00* (2013.01); *B60R 9/10* (2013.01)

(58) Field of Classification Search
CPC ......... Y10S 224/924; B60R 9/00; B60R 9/06; B60R 9/08; B60R 9/10; B62H 3/00; B62H 3/08
USPC ................................................ 224/502–509
See application file for complete search history.

(56) References Cited

U.S. PATENT DOCUMENTS

| | | | |
|---|---|---|---|
| 5,303,857 A * | 4/1994 | Hewson | B60R 9/06 224/282 |
| 5,363,996 A * | 11/1994 | Raaber | B60R 9/06 224/314 |
| 5,685,469 A * | 11/1997 | Stapleton | B60R 9/10 224/505 |
| 5,730,345 A * | 3/1998 | Yeckley | B60R 9/06 224/505 |
| 6,460,745 B1 * | 10/2002 | Weaver | B60R 9/06 211/17 |
| 8,066,162 B2 * | 11/2011 | Chiang | B60R 9/10 224/497 |
| 9,321,406 B2 * | 4/2016 | Loken | B60R 9/10 |
| 10,093,243 B2 * | 10/2018 | Shen | B60R 9/10 |
| 10,214,152 B1 * | 2/2019 | Bass | B60R 9/10 |
| 10,668,866 B2 * | 6/2020 | Kuschmeader | B60R 9/10 |
| 2013/0022440 A1 * | 1/2013 | Sautter | B60R 9/06 414/800 |

(Continued)

FOREIGN PATENT DOCUMENTS

TW   I642573 B   12/2018

*Primary Examiner* — Patrick D Hawn
(74) *Attorney, Agent, or Firm* — Muncy, Geissler, Olds & Lowe, P.C.

(57) ABSTRACT

An anti-rapid drop bicycle rack and its joint in which the joint provides an anti-rapid drop function. The joint includes a holder block having two upright plates and a guiding hole on each upright plate, and a swing assembly including a hollow body, a mount, an actuating rod, a handle, an interference member and a spring. The bottom edge of each guiding hole defines a standing positioning groove at the front side, an inclined positioning groove at the rear side, and an intermediate positioning groove between the standing positioning groove and the inclined positioning groove. The interference member is elastically abutted against the groove bottom of one of the standing positioning groove, the inclined positioning groove and the intermediate positioning groove of each of the two guiding holes.

13 Claims, 12 Drawing Sheets

(56) References Cited

U.S. PATENT DOCUMENTS

| | | | |
|---|---|---|---|
| 2015/0083769 A1* | 3/2015 | Williams | B60R 9/06 |
| | | | 224/488 |
| 2015/0123425 A1* | 5/2015 | Huston | B60P 7/0815 |
| | | | 296/183.1 |
| 2016/0068110 A1* | 3/2016 | Prescott | B60R 9/06 |
| | | | 224/521 |
| 2018/0134229 A1* | 5/2018 | Shen | B60R 9/06 |
| 2021/0009223 A1* | 1/2021 | Tsai | B60R 9/10 |

* cited by examiner

ANTI-RAPID DROP BICYCLE RACK AND ITS ANTI-RAPID DROP JOINT

BACKGROUND OF THE INVENTION

1. Field of the Invention

The present invention relates to bicycle rack technology and more particularly, to an anti-rapid drop bicycle rack and its anti-rapid drop joint.

2. Description of the Related Art

Taiwan Patent No. I642573 discloses a bicycle rack, in which the second sliding block (referenced by 45) is elastically inserted into one positioning groove (referenced by 223, 224) in a second sliding arch slot (referenced by 222) between the second coupling (referenced by 41) and the second slip seat (referenced by 22). When the second sliding block is inserted in the positioning groove (223), the second coupling is held in vertical. When the second sliding block is inserted in the positioning groove (224), the second coupling is turned down to a horizontal state. By means of mounting the second sliding block in one of the two positioning grooves, the second coupling is set in vertical or horizontal. When the second coupling is to be changed from the vertical position to the horizontal position, the second sliding block is first released. That is, by operating the first knob (referenced by 43), the second sliding block is moved upward to disengage from the positioning groove (223), then, the second coupling is placed in a horizontal position, and then the spring force of the second spring (referenced by 46) pushes the second sliding block into the positioning groove (224), and the operation is completed.

However, since the aforementioned second coupling connects the main body of the entire bicycle rack, the entire bicycle rack has a considerable weight. When a bicycle is disposed on the entire bicycle rack, the weight carried on the second coupling is very large. In this way, when the second coupling is to be changed from the vertical position to the horizontal position, if the operator does not hold the upright stanchion (referenced by 121) or the structure connected thereto to move it down slowly, the whole bicycle rack is very likely to fall sharply when it is swung down, because of its large body weight. This is very likely to injure the operator or cause the second slip seat (22) to be damaged by a powerful impact. Therefore, the shortcomings of the aforesaid prior art bicycle rack formed by the aforesaid coupling and slip seat are necessary to be improved.

The problem of the above-mentioned conventional technology that the bicycle rack may drop rapidly during operation needs to be improved to make the bicycle rack safer and more durable.

SUMMARY OF THE INVENTION

The present invention has been accomplished under the circumstances in view. It is the main object of the present invention to provide an anti-rapid drop bicycle rack and its anti-rapid drop joint, which can add a mechanism that can be stopped during the swinging of the bicycle rack from the standing position to the most inclined position, so that the bicycle rack will not fall from the standing state to the most inclined state at one time, but will stop in the middle stroke to avoid injury to the personnel and to effectively protect the bicycle rack itself against damage, making the bicycle rack more secure and durable.

To achieve this object of the present invention, an anti-rapid drop joint for bicycle rack comprises a holder block and a swing assembly. The holder block comprises two upright plates parallel to each other and separated by a predetermined distance. The two upright plates of the holder block respectively have a guiding hole. The guiding holes of the two upright plates are opposite to each other. The swing assembly is pivoted to the two upright plates and located between the two upright plates, comprising a hollow body, a mount, an actuating rod, a handle, an interference member and a spring. The mount is located on the hollow body. The actuating rod passes through the mount and partially extends into the hollow body. The handle is located on the mount and coupled to the actuating rod and operable to move the actuating rod up and down relative to the hollow body. The interference member is located at a bottom of the actuating rod and moves with the actuating rod, having an interference rod respectively extended from each of two opposite sides thereof. The two interference rods respectively pass through the two through holes and extend into the guiding holes of the two upright plates. The spring has two ends thereof abutting against the interference member and the mount respectively. The elastic restoring energy of the spring causes the interference member to move downward along with the actuating rod. Further, each guiding hole has a bottom edge. The bottom edge of each guiding hole defines a standing positioning groove at a front end, an inclined positioning groove at an opposite rear end, and an intermediate positioning groove between the standing positioning groove and the inclined positioning groove. The standing positioning groove, the inclined positioning groove and the intermediate positioning groove each have a groove bottom and a groove wall located at a rear side of the groove bottom. The elastic restoring energy of the spring causes the two interference rods to respectively abut to the groove bottom of one of the standing positioning groove, the inclined positioning groove and the intermediate positioning groove. When the two interference rods respectively fit the standing positioning grooves of the guiding holes, the hollow body is standing. When the two interference rods respectively fit the inclined positioning grooves of the guiding holes, the hollow body is inclined.

To achieve this object of the present invention, an anti-rapid drop bicycle rack using the aforesaid anti-rapid drop joint comprises a connecting rod, a holder block and a swing assembly. The connecting rod has a front end thereof adapted for connecting to a connection portion of a car tail. The holder block comprises two upright plates parallel to each other and separated by a predetermined distance. The two upright plates of the holder block are located at an opposing rear end of the connecting rod and respectively have a guiding hole. The guiding holes of the two upright plates are opposite to each other. The swing assembly is pivoted to the two upright plates and located between the two upright plates. The swing assembly is provided with at least one bicycle mounting bracket, comprising a hollow body, a mount, an actuating rod, a handle, an interference member and a spring. The mount is located on the hollow body. The actuating rod passes through the mount and partially extends into the hollow body. The handle is located on the mount and coupled to the actuating rod and operable to move the actuating rod up and down relative to the hollow body. The interference member is located at a bottom of the actuating rod and moves with the actuating rod. The interference member has an interference rod respectively extended from each of two opposite sides thereof. The two interference rods respectively pass through the two through holes and extend into the guiding holes of the two upright plates. The spring has two ends thereof abutting against the interference member and the mount respectively. The elastic restoring energy of the spring causes the interference member to move downward along with the actuating rod. Further, each guiding hole has a bottom edge. The bottom edge of each guiding hole defines a standing positioning groove at a front end, an inclined positioning groove at an opposite rear end and an intermediate positioning groove between the standing positioning groove and the inclined positioning groove. The standing positioning groove, the inclined positioning groove and the intermediate positioning groove each have a groove bottom and a groove wall located a rear side of the groove bottom. The elastic restoring energy of the spring causes the two interference rods to respectively abut to the groove bottom of one of the standing positioning groove, the inclined positioning groove and the intermediate positioning groove. When the two interference rods respectively fit the standing positioning grooves of the guiding holes, the hollow body is standing. When the two interference rods respectively fit the inclined positioning grooves of the guiding holes, the hollow body is inclined.

In actual use of an anti-rapid drop joint for bicycle rack provided by the present invention and an anti-rapid drop bicycle rack using the anti-rapid drop join, the arrangement of the intermediate positioning groove allows the hollow body to be swung from a standing state to an inclined state, and the hollow body will be stopped halfway if the handle is not operated by a person during the swinging movement of the hollow body from the standing state to the inclined state. Thereby, the main body of the bicycle rack will not be directly dropped from the standing state to the most inclined state at one time, and will stop in the middle stroke, avoiding injury to the person, and can effectively protect the bicycle rack itself, making the bicycle rack safer and more durable.

Other advantages and features of the present invention will be fully understood by reference to the following specification in conjunction with the accompanying drawings, in which like reference signs denote like components of structure.

DETAILED DESCRIPTION OF THE INVENTION

Figure 1:
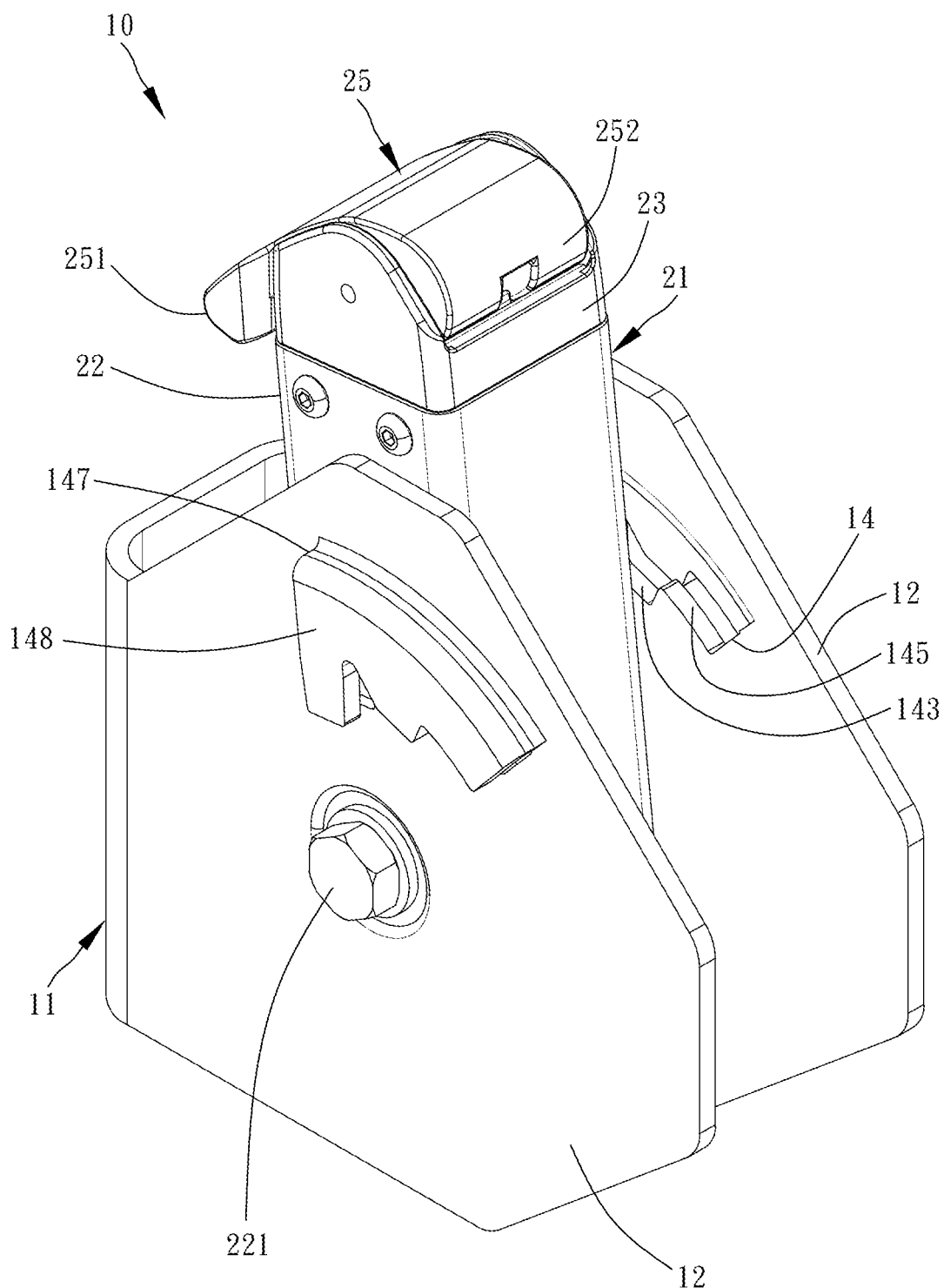
FIG. 1 is an oblique top elevational view of an anti-rapid drop joint for bicycle rack in accordance with the present invention.
Figure 2:
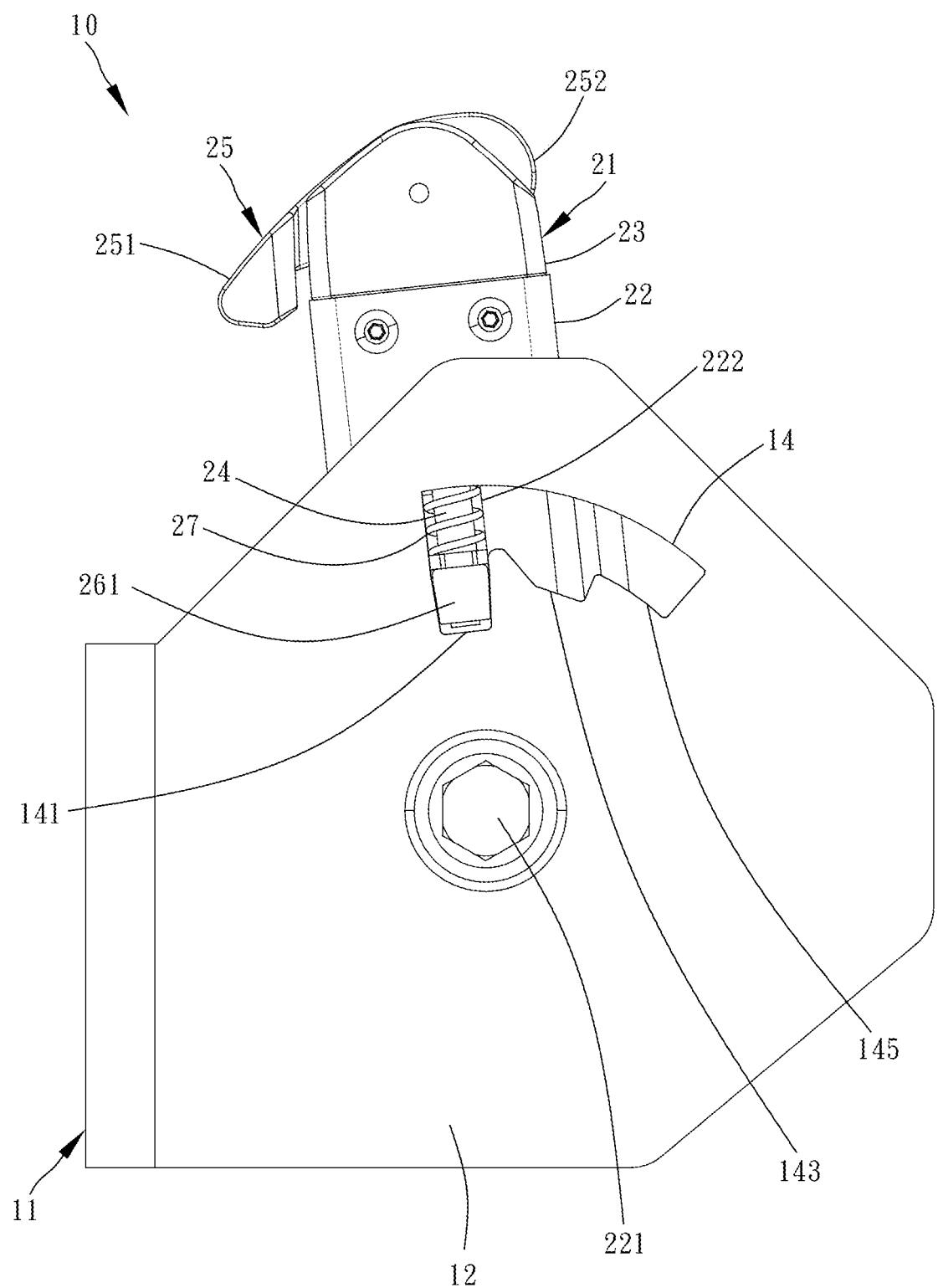
FIG. 2 is a side view of the anti-rapid drop joint after removal of the cover and the shoulder.
Figure 3:
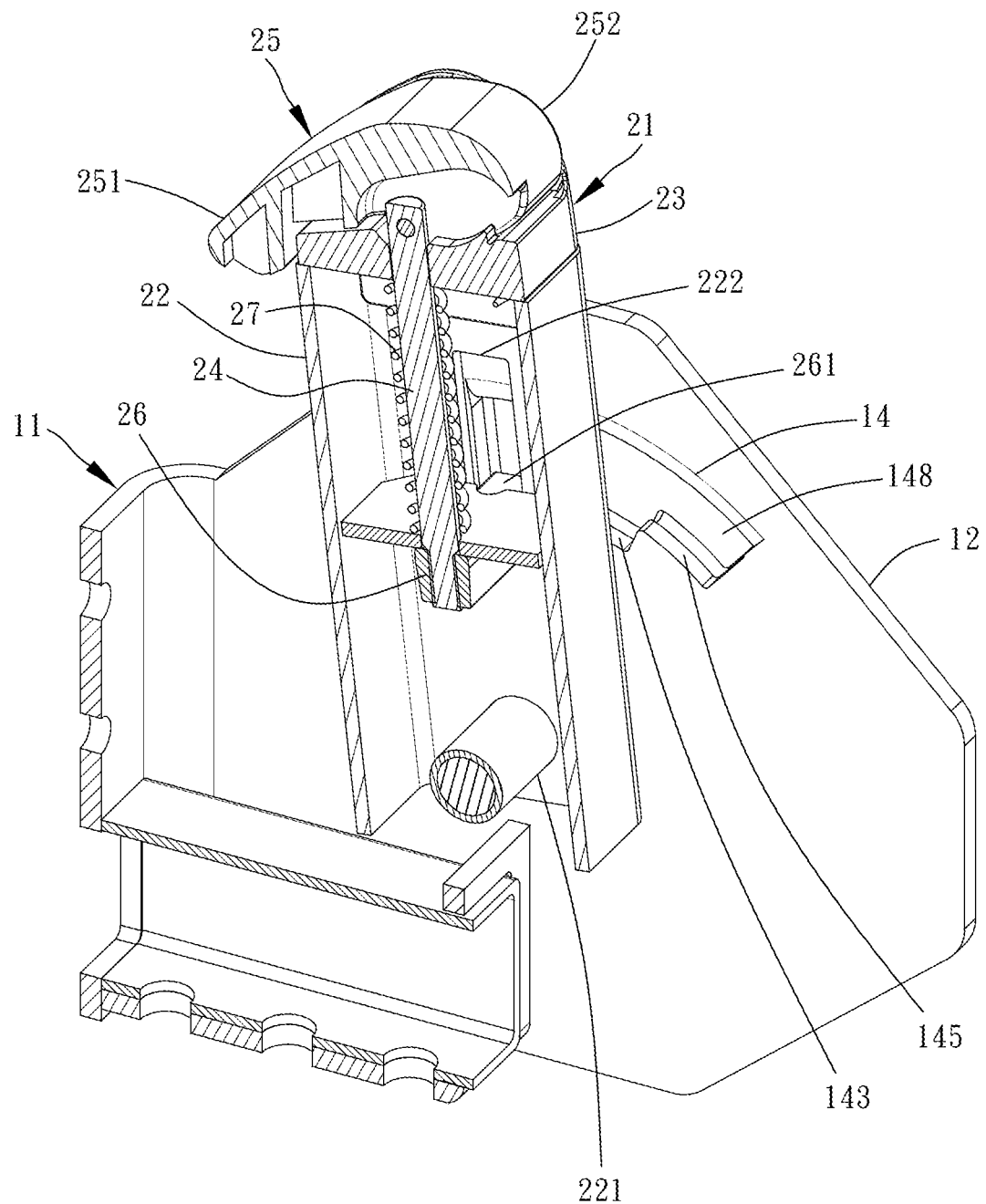
FIG. 3 is a sectional elevational view of the anti-rapid drop joint, illustrating the internal structure of the swing assembly.
Figure 4:
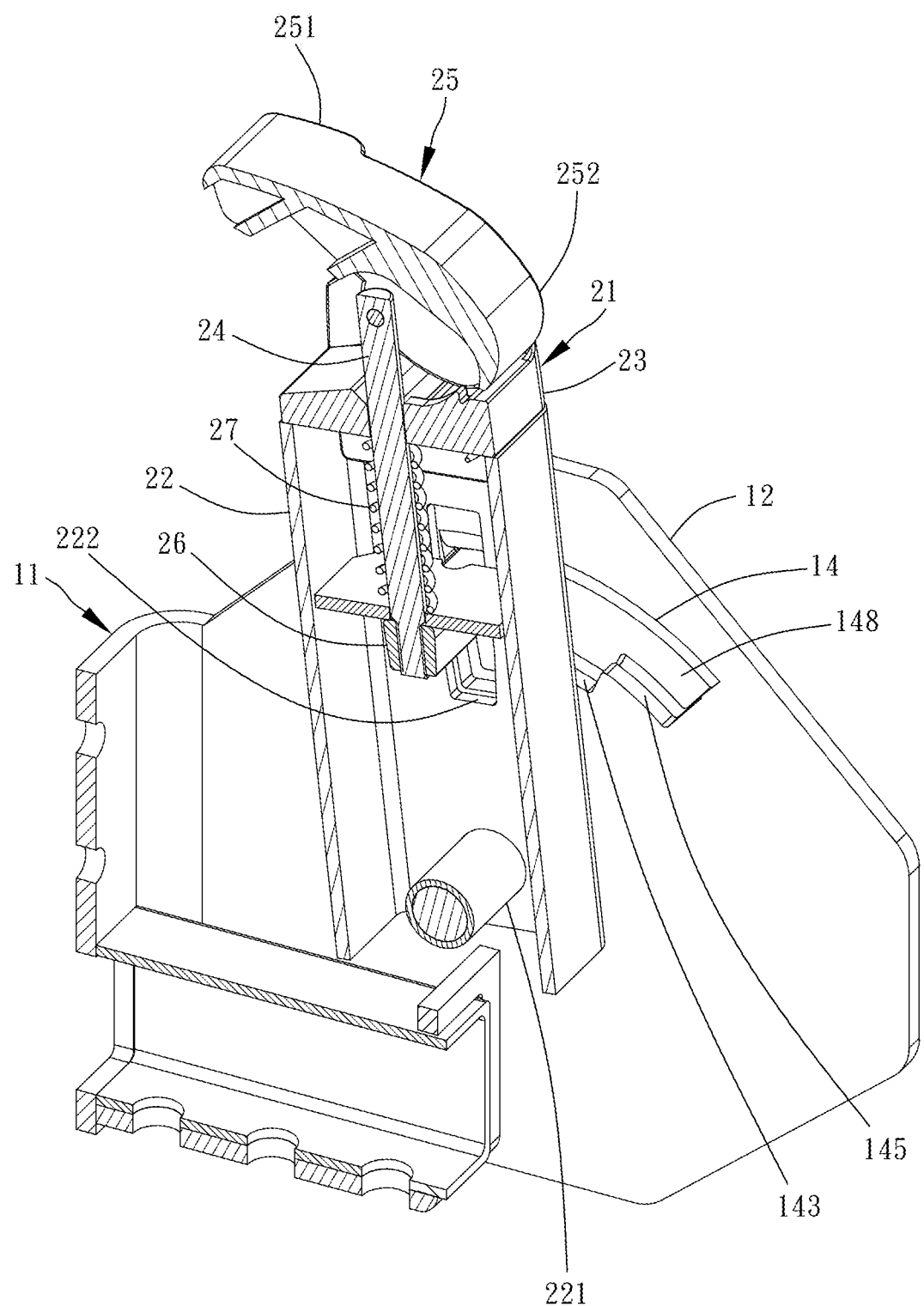
FIG. 4 is similar to FIG. 3, showing the handle operated.
Figure 5:
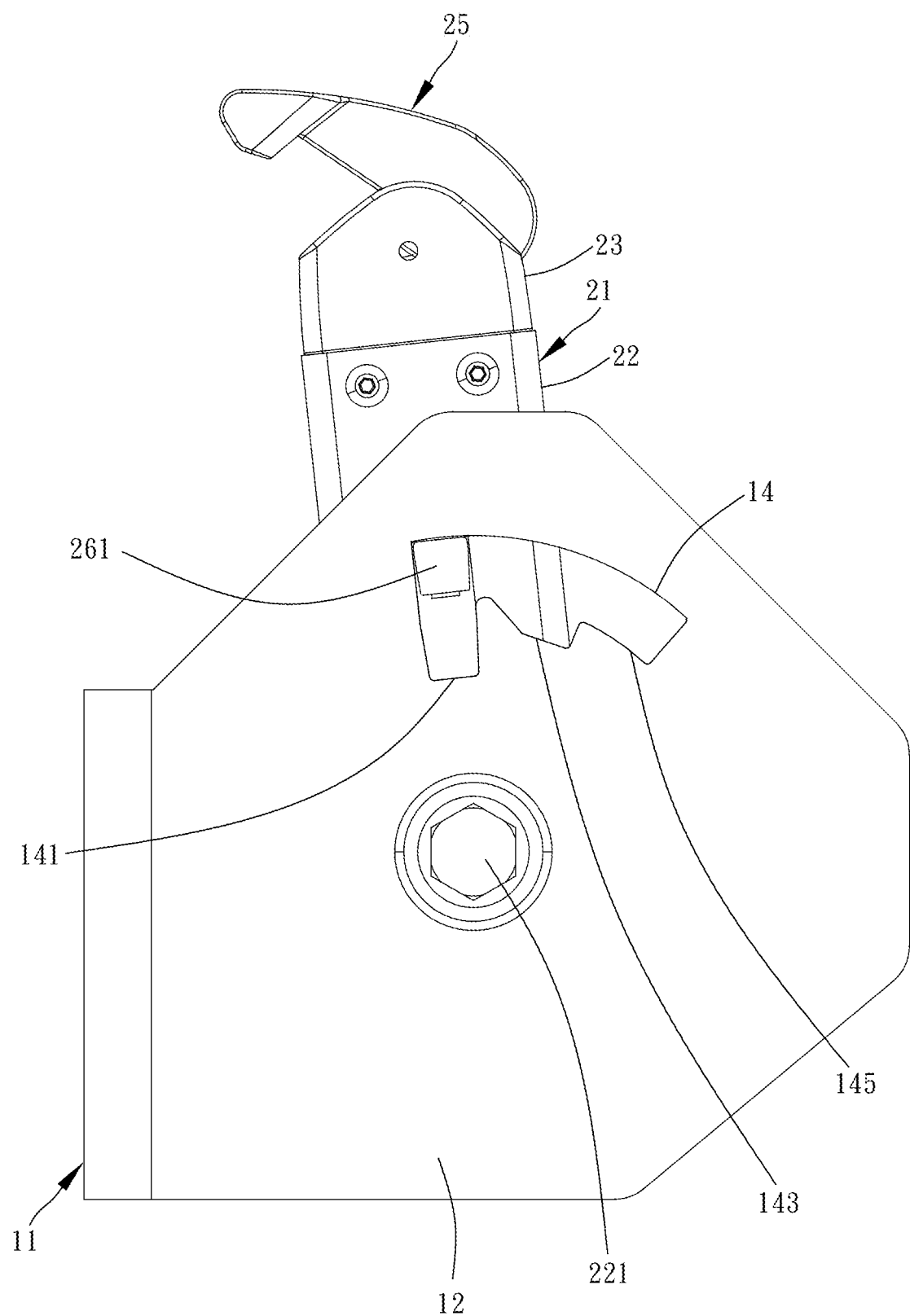
FIG. 5 is similar to FIG. 2, showing the handle operated.

Referring to FIGS. 1-5, an anti-rapid drop 10 for bicycle rack in accordance with the present invention is shown. The anti-rapid drop joint 10 mainly consists of a holder block 11 and a swing assembly 21.

The holder block 11 mainly comprises two upright plates 12, and the two upright plates 12 are parallel to each other and separated by a predetermined distance. The two upright plates 12 of the holder block 11 respectively have a guiding hole 14, the guiding holes 14 of the two upright plates 12 are opposite to each other.

The swing assembly 21 is pivoted to the two upright plates 12 and located between the two upright plates 12. The swing assembly 21 comprises a hollow body 22, a mount 23, an actuating rod 24, a handle 25, an interference member 26 and a spring 27.

The hollow body 22 is a tubular member pivoted to the two upright plates 12 by a pivot 221, and the hollow body 22 has a through hole 222 on each of two opposite sides thereof. The mount 23 is located at the top of the hollow body 22. The actuating rod 24 passes through the mount 23 and partially extends into the hollow body 22. The handle 25 is located on the mount 23 and coupled to the actuating rod 24 and operable to move the actuating rod 24 up and down relative to the hollow body 22. The interference member 26 is located at the bottom of the actuating rod 24 and moves with the actuating rod 24. The interference member 26 has an interference rod 261 respectively extended from each of two opposite sides thereof. The two interference rods 261 respectively pass through the two through holes 222 and extend into the guiding holes 14 of the two upright plates 12. The spring 27 has its two ends abutting against the interference member 26 and the mount 23 respectively, and its elastic restoring energy causes the interference member 26 to move downward along with the actuating rod 24. In this embodiment, the guiding holes 14 of the two upright plates 12 are located above the pivot 221. The handle 25 is disposed at the top of the actuating rod 24 and forms a grip 251 and a cam 252 on two opposite sides relative to the actuating rod 24. The cam 252 acts on the top of the mount 23.

The bottom edge of each guiding hole 14 has a standing positioning groove 141 at a front end, an inclined positioning groove 145 at an opposite rear end, and an intermediate positioning groove 143 between the standing positioning groove 141 and the inclined positioning groove 145. Each of the foregoing grooves has a groove bottom and a groove wall located behind the groove bottom, and the groove bottom of each of the grooves is flat, so that the groove bottom is substantially perpendicular to the groove wall at the rear thereof.

Wherein, the bottom of each of the interference rods 261 is flat and fits to the bottom of each of the forgoing grooves, and according to the swing position of the hollow body 22, the elastic restoring energy of the spring 27 causes the two interference rods 261 to respectively abut to the groove bottom of one of the standing positioning groove 141, the inclined positioning groove 145 and the intermediate positioning groove 143. When the two interference rods 261 respectively fit the standing positioning grooves 141 of the guiding holes 14, the hollow body 22 is standing. When the two interference rods 261 respectively fit the inclined positioning grooves 145 of the guiding holes 14, the hollow body 22 is inclined. More specifically, the groove wall at the front side of the groove bottom of the intermediate positioning groove 143 of the guiding hole 14 of each upright plate 12 is inclined upward with respect to the groove bottom, and the groove bottom of the inclined positioning groove 145 is adjacent to the top edge of the groove wall of the intermediate positioning groove 143 to form a stepped shape.

In addition, each upright plate 12 extends a shoulder 147 outwardly from the upper edge of its guiding hole 14, and a cover 148 extends downwardly from the shoulder 147. The cover 148 of each upright plate 12 is spaced apart from the guiding hole 14 by a predetermined distance and shields the guiding hole 14, and the cover 148 can be used to protect personnel from accidentally touching the guiding hole 14, thereby avoiding pinching accident.

The structure of the anti-rapid drop 10 in accordance with the first embodiment of the present invention has been described above, and the operation state of this first embodiment will be described hereinafter.

Figure 6:
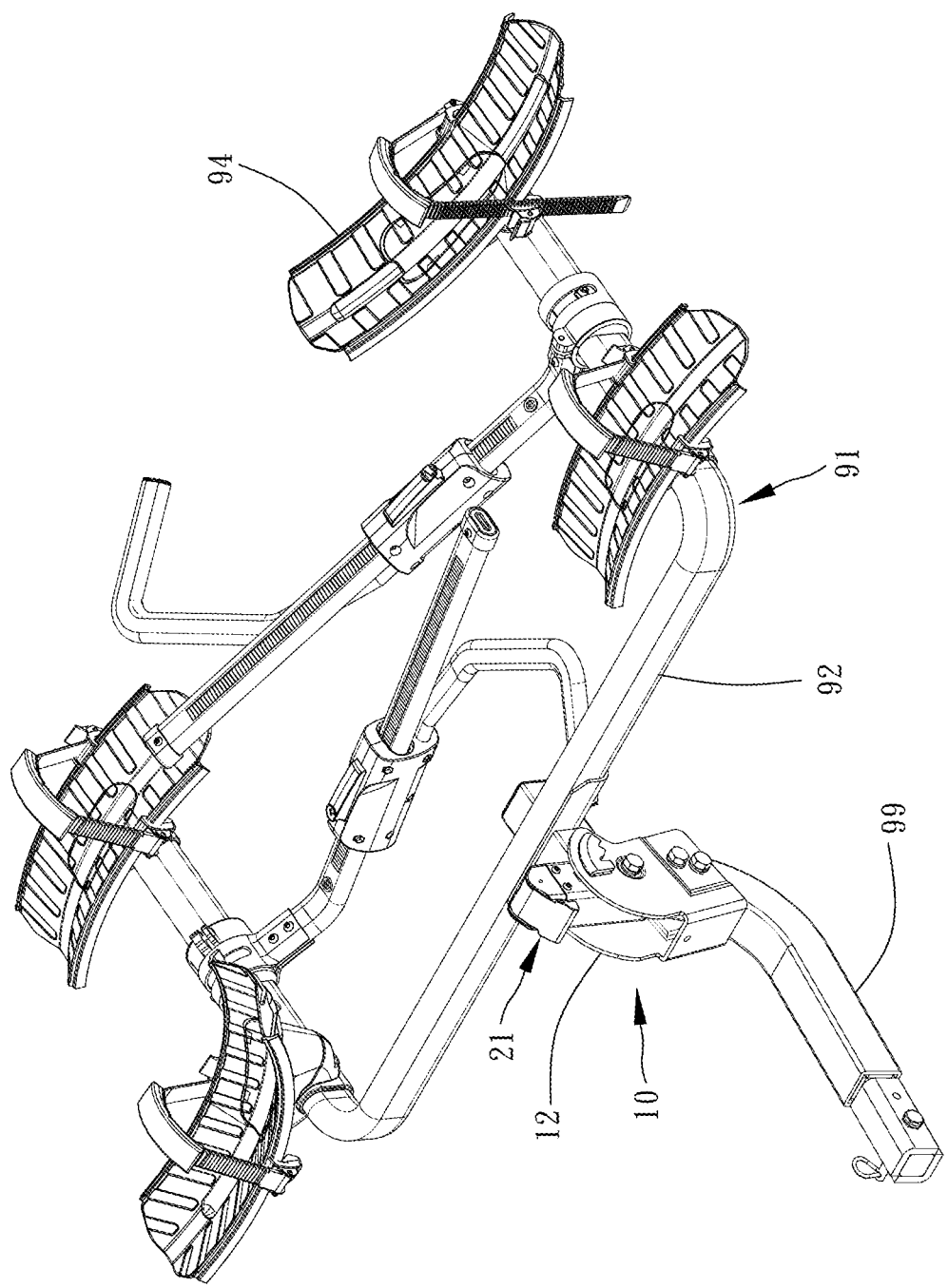
FIG. 6 is an oblique top elevational view of an anti-rapid drop bicycle rack in accordance with the present invention.

As shown in FIG. 6, before the operation, the invention is assembled on a bicycle rack and used for swinging. When assembled, the main body 91 of the bicycle rack is disposed on the hollow body 22, and the main body 91 of the bicycle rack mainly includes a base 92 and bicycle mounting brackets 94. The base 92 is affixed to the hollow body 22 by, for example, soldering, and the holder block 11 is connected to a connecting rod 99 by the same soldering process. After such assembly is completed, a bicycle rack for preventing the main pole from falling rapidly is formed, and the connecting rod 99 can be used for connecting a connecting tube of a car tail (not shown).

Figure 7:
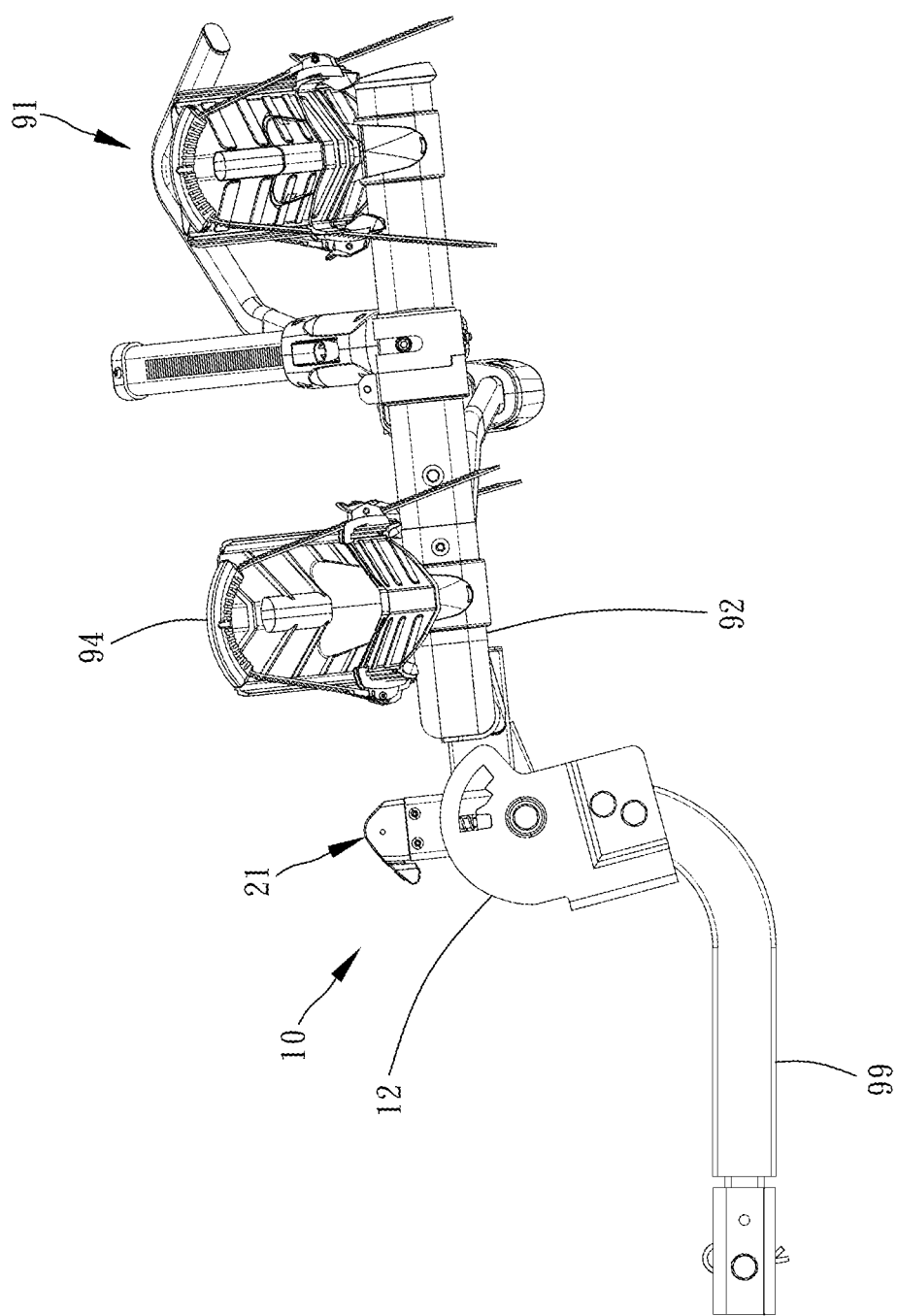
FIG. 7 is a side view of the anti-rapid drop bicycle rack shown in FIG. 6, showing the swing assembly in the standing state.

As shown in FIG. 6 to FIG. 9, in operation, when the two interference rods 261 respectively abut against the respective standing positioning grooves 141 at the front ends of the two guiding holes 14, the hollow body 22 is standing, and the position this position is where the main body 91 of the bicycle rack is in a standing position, as shown in FIG. 7. In this standing state, in a state within a guiding hole 14, the interference rod 261 is located in the standing positioning groove 141 and abutted against the groove bottom and is limited by the groove wall behind the standing positioning groove 141. Therefore, the interference rod 261 cannot move to the intermediate positioning groove 143 but is equal to being positioned in the standing positioning groove 141. By the interference rod 261 passing through the through hole 222 of the hollow body 22, the hole edge of the through hole 222 of the hollow body 22 acts on the interference rod 261 to generate the same swinging relationship with the interference rod 261. The effect of the movement, and thus the main body 91 of the bicycle rack is positioned in its standing state.

Figure 8:
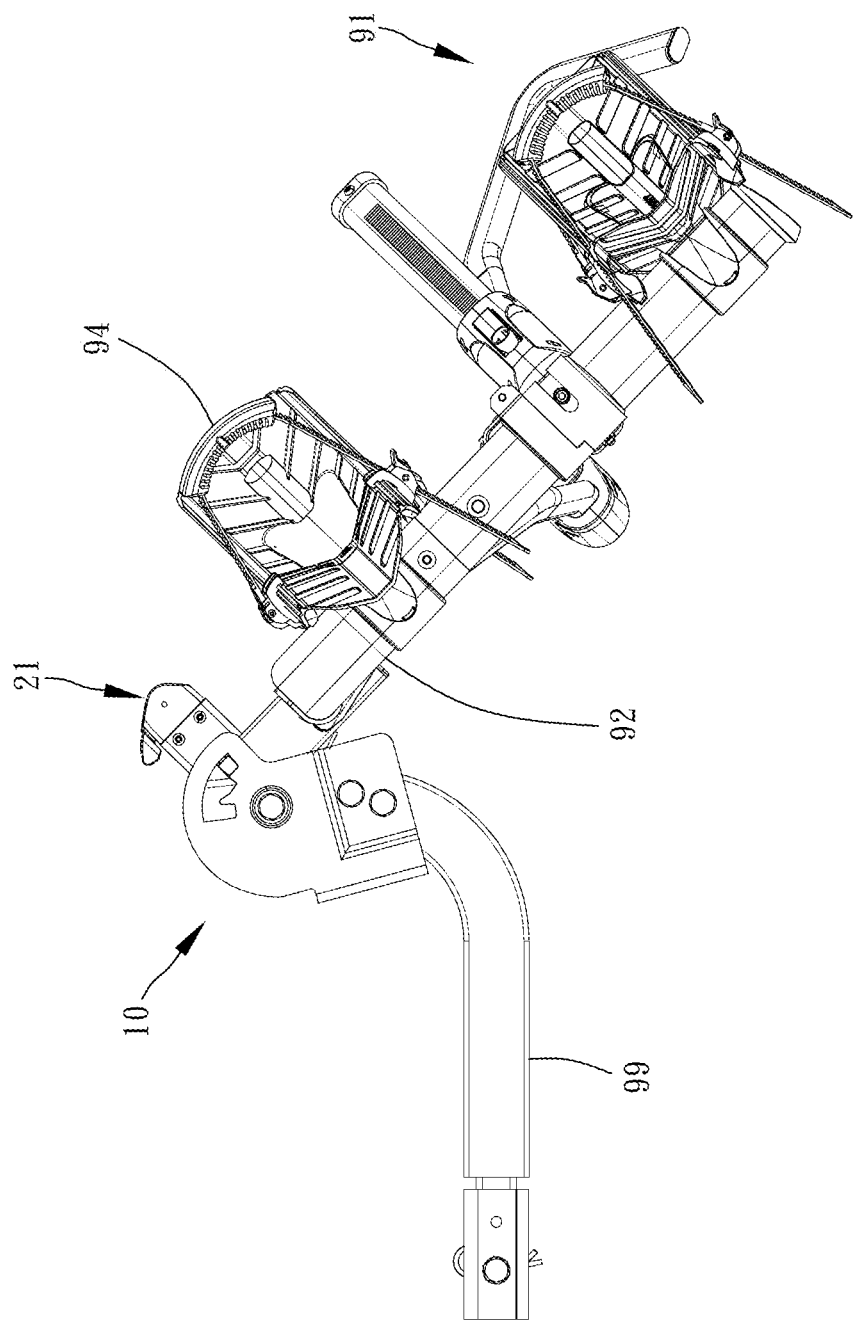
FIG. 8 corresponds to FIG. 7, showing the swinging assembly in the inclined state.

Referring to FIGS. 7 and 8 and FIGS. 4 and 5 again, when the main body 91 of the bicycle rack is to be changed from the standing state of FIG. 7 to the tilting state of FIG. 8, the grip 251 of the handle 25 is first manually lifted. When the handle 25 is tilted, the cam 252 is used as a fulcrum to act on the mount 23, and the actuating rod 24 is pulled up, and the interference member 26 is pulled up together with the two interference rods 261 to compress the spring 27. In a state within the guiding hole 14, after the interference rod 261 rises above the groove wall at the rear side of the standing positioning groove 141, it leaves from the standing positioning groove 141. At this time, the positioning state is released, and the user can tilt the main body 91 of the bicycle rack backward. In the process of tilting, if the user continues to hold the handle 25, the interference rod 261 will cross the intermediate positioning groove 143 and directly enter the inclined positioning groove 145. Since the main body 91 of the bicycle rack is inclined at this time, its weight is applied to the groove wall at the rear side of the inclined positioning groove 145 by the interference rod 261. After the user releases the handle 25, the elastic restoring force of the spring 27 causes the interference rod 261 to be pressed against the groove bottom of the inclined positioning groove 145. At this time, the interference rod 261 is in contact with the groove bottom and groove wall of the inclined positioning groove 145. At this point, the hollow body 22 is inclined, the main body 91 of the bicycle rack is inclined and stabilized at this position by the action of gravity, and its state is as shown in FIG. 8.

Figure 9:
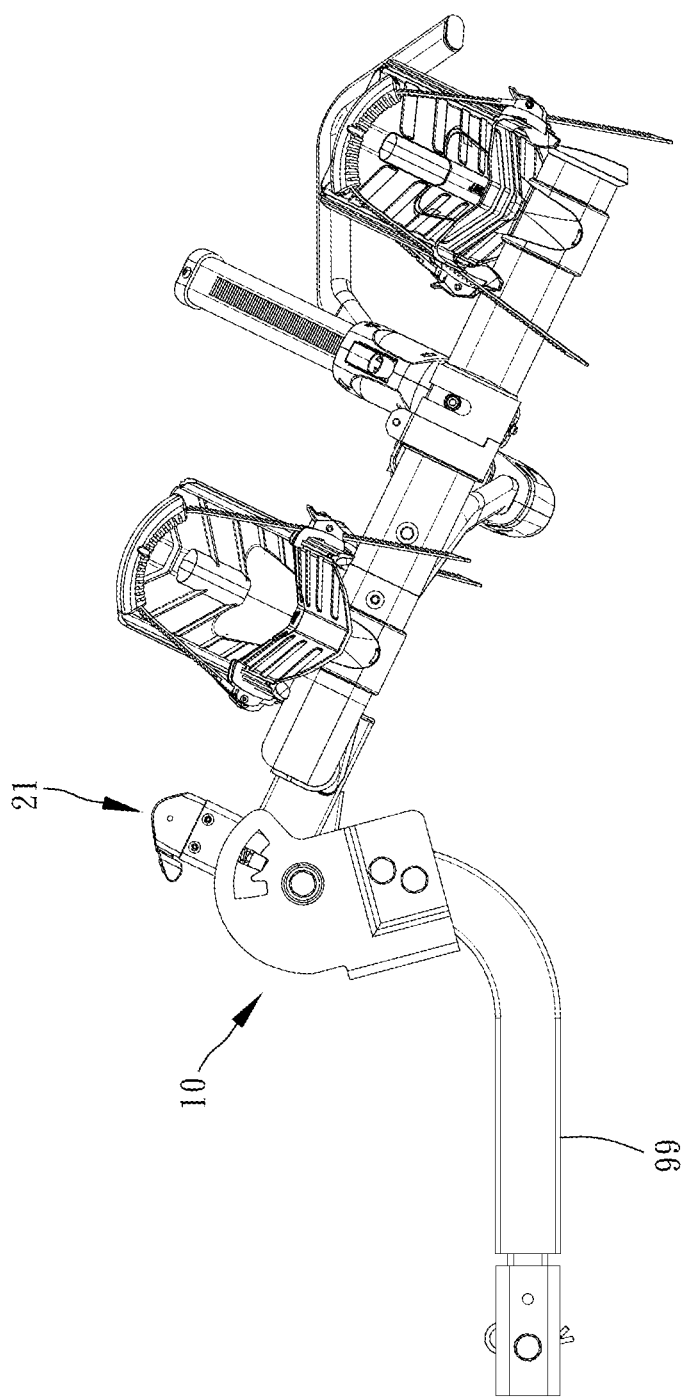
FIG. 9 corresponds to FIG. 7, showing the interference rod abutted against the intermediate positioning groove.

Referring to FIGS. 7-9, in the foregoing process of changing the main body 91 of the bicycle rack from the standing state to the tilting state, in a state within the guiding hole 14, if the user releases the handle 25 after pulled the handle 25 to release the interference rod 261 from the standing positioning groove 141 before the interference rod 261 entering the inclined positioning groove 145, at this time, by the elastic restoring force of the spring 27, the interference rod 261 will immediately move downward to abut against the groove bottom of the intermediate positioning groove 143. At the same time, the main body 91 of the bicycle rack will be slightly inclined due to the transition from the standing state to the inclined state, and the acceleration of the tilt will begin due to gravity. The interference rod 261 moves along the groove bottom of the intermediate positioning groove 143 as the main body 91 of the bicycle rack tilts and will stop until it abuts against the groove wall at the rear side of the intermediate positioning groove 143. When the interference rod 261 abuts against the groove wall, the hollow body 22 and the main body 91 of the bicycle rack are stopped, and the state as shown in FIG. 9 is presented. At this time, the main body 91 of the bicycle rack is stopped when it is halfway down, and it does not stop when the direct tilt of the one-stop position falls to the above-mentioned inclined position. If the user still wants to move the main body 91 of the bicycle rack to the inclined position, then the handle 25 is further tilted to raise the interference rod 261 higher than the groove wall at the rear side of the intermediate positioning groove 143. At this point, the main body 91 of the bicycle rack can be tilted back again until the interference rod 261 abuts the groove wall at the rear side of the inclined positioning groove 145 and returns to the state of FIG. 8.

To move the main body 91 of the bicycle rack together with the hollow body 22 from the inclined position to the standing position, the user does not need to operate the handle 25 anymore, but only needs to directly push the main body 91 of the bicycle rack to move from the inclined position to the standing position. During this movement, in a state within the guiding hole 14, the interference rod 261 is slid from the position abutting against the groove bottom of the inclined positioning groove 145 toward the intermediate positioning groove 143. Because the groove wall at the rear side of the intermediate positioning groove 143 is adjacent to the groove bottom of the inclined positioning groove 145 to form a stepped shape, the interference rod 261 will slide from the groove bottom of the inclined positioning groove 145 to the groove bottom of the intermediate positioning groove 143. Thereafter, the interference rod 261 continues to move forward and slides with its bottom over the inclined groove wall at the front side of the groove bottom of the intermediate positioning groove 143. Although the interference rod 261 will be slightly elevated at this point, it can slide unimpeded due to the inclined groove wall. Then the interference rod 261 falls into the standing positioning groove 141. At this point, the movement to the standing position is completed. It should be noted that the rearward groove wall of the intermediate positioning groove 143 is stepped adjacent to the groove bottom of the inclined positioning groove 145, and the groove wall at the front side of the groove bottom of the intermediate positioning groove 143 is inclined. These two technical features are to allow the interference rod 261 to slide directly through the back-to-front movement without being hindered, thereby facilitating the user's operation. However, the present invention may also be provided in such a manner that the aforementioned stepped structure and the inclined groove wall are not provided, and the junction between each two adjacent grooves does not allow the interference rod 261 to move over by sliding. In this way, when the main body 91 of the bicycle rack is pushed back from the inclined position to the standing position, the user still needs to operate the handle 25 to raise the interference rod 261 to complete the operation smoothly. Under this structural arrangement, when the main body 91 of the bicycle rack changes from the standing state to the inclined state, even if the user accidentally loosens the handle 25, the interference rod 261 can still directly enter the intermediate positioning groove 143 to play the role in preventing rapid drop.

Figure 10:
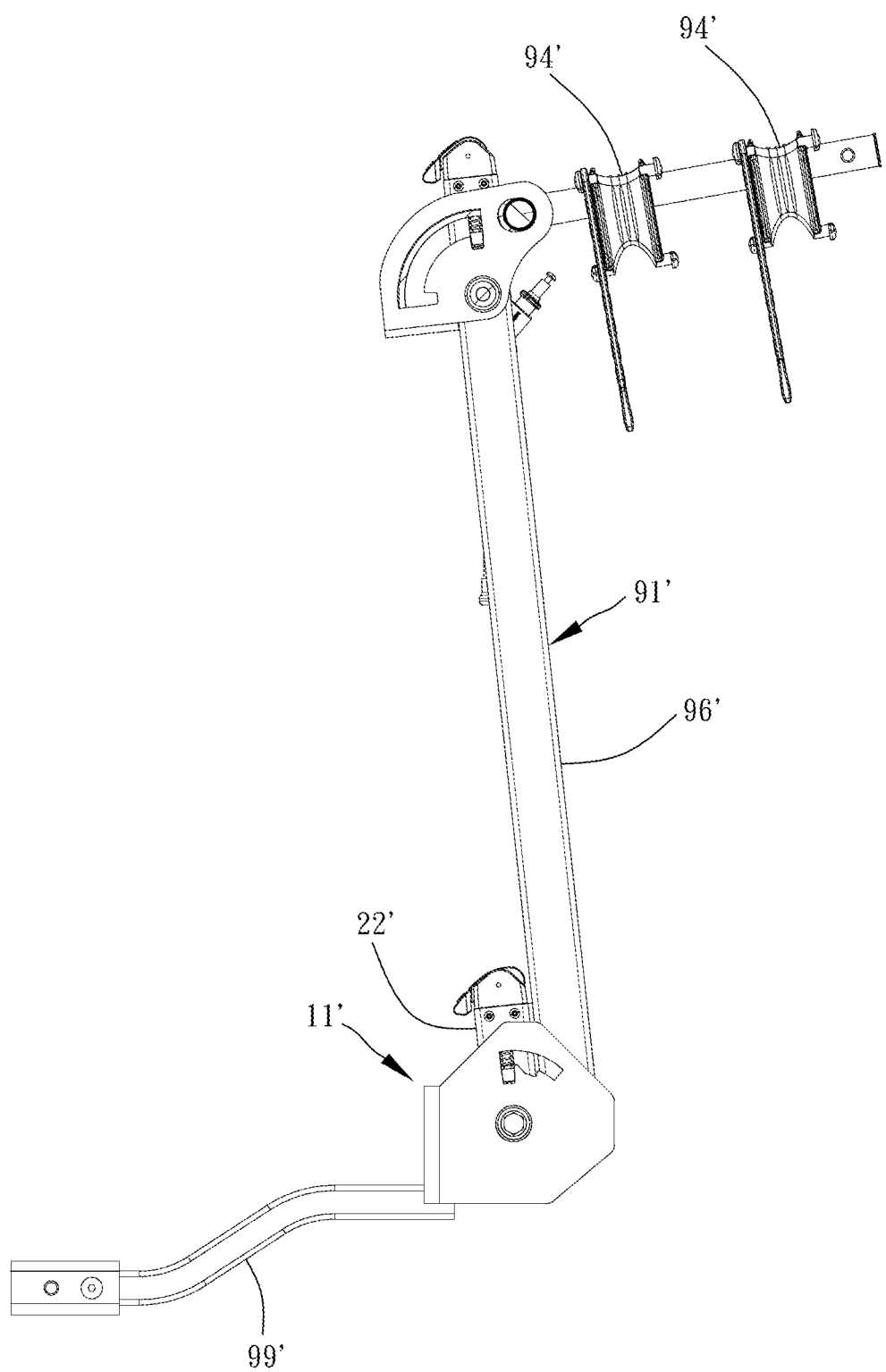
FIG. 10 is an oblique top elevational view of an alternate form of the anti-rapid drop bicycle rack in accordance with the present invention.

As shown in FIG. 10, when the anti-rapid drop joint is assembled on a bicycle rack, if the main body 91' of the bicycle rack is different from the foregoing structure but includes an upright stanchion 96' and bicycle mounting brackets 94' without having the base shown in FIG. 6, there will be different from the assembly method described above. In assembly, the bottom of upright stanchion 96' of the main body 91' of the bicycle rack is directly mounted on the hollow body 22', and the holder block 11' is attached to a connecting rod 99', and the bicycle mounting brackets 94' are mounted on top of the upright stanchion 96'. In this way, the aforementioned anti-rapid drop effect can also be formed in operation.

Figure 11:
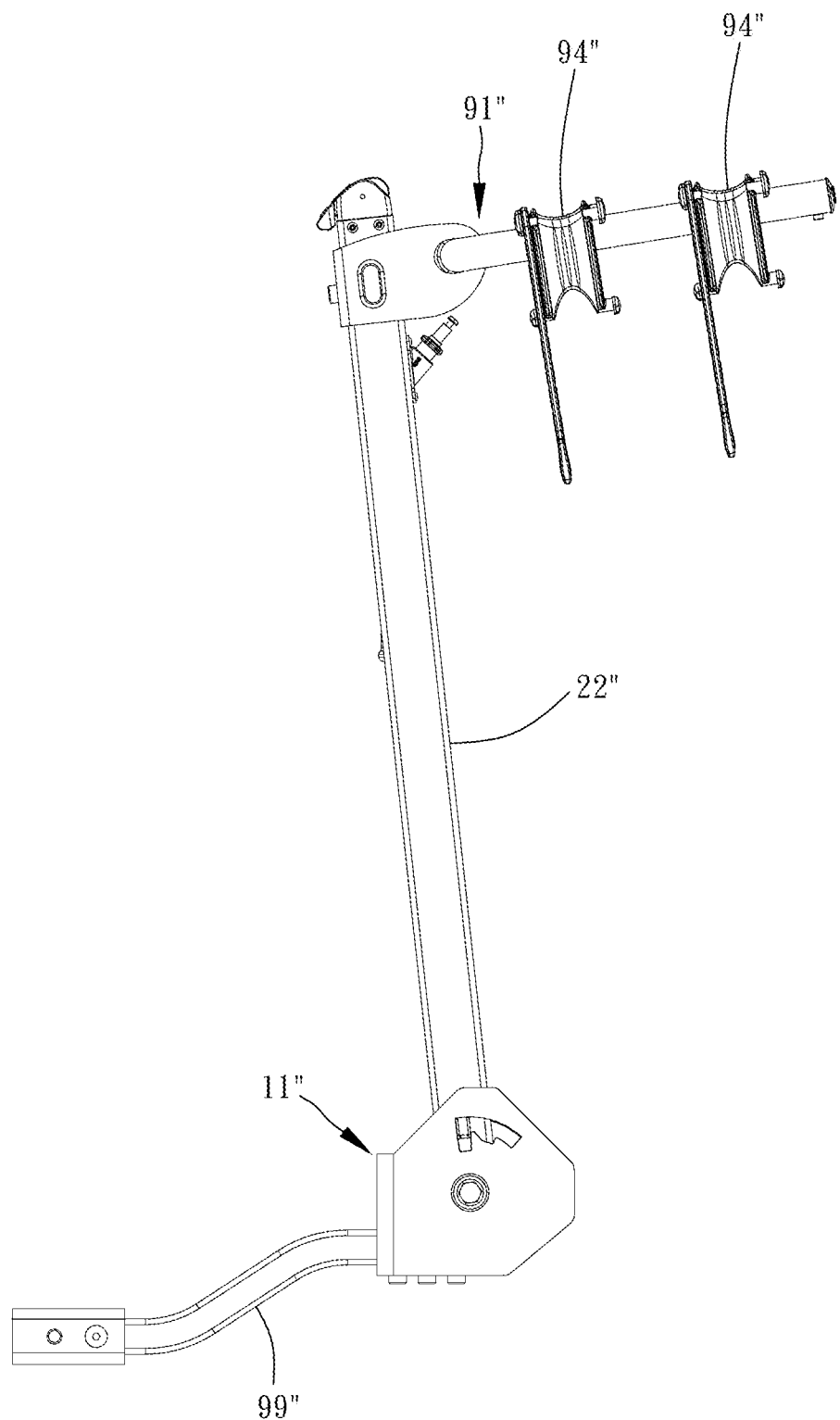
FIG. 11 is an oblique top elevational view of another alternate form of the anti-rapid drop bicycle rack in accordance with the present invention.

As shown in FIG. 11, when the anti-rapid drop joint is assembled on a bicycle rack, if the main body 91" of the bicycle rack is different from the foregoing structure but includes bicycle mounting brackets 94' without having the base shown in FIG. 6 or the upright stanchion shown in FIG. 10, there will be different from the assembly method described above. In assembly, the hollow body 22" that has an elongated shape is directly used as an upright stanchion, and the holder block 11" is attached to a connecting rod 99". In this way, the aforementioned anti-rapid drop effect can also be formed in operation.

As can be seen from the above, the anti-rapid drop joint 10 of the present invention, in actual use, can be configured by the intermediate positioning groove 143 to allow the hollow body 22 to be swung from a standing state to an inclined state, and the hollow body 22 will be stopped halfway if the handle is not operated by a person during the swinging movement of the hollow body 22 from the standing state to the inclined state. Thereby, the main body 91 of the bicycle rack will not be directly dropped from the standing state to the most inclined state at one time, and will stop in the middle stroke, avoiding injury to the person, and can effectively protect the bicycle rack itself, making the bicycle rack safer and more durable. However, if the handle 25 is operated by a person, it is possible for the person to freely select whether or not the hollow body 22 is directly allowed to swing from the standing state to the inclined state. When the anti-rapid drop joint 10 of the present invention is mounted on a bicycle rack, an anti-rapid drop bicycle rack is formed which can prevent the main pole from falling rapidly.

Figure 12:
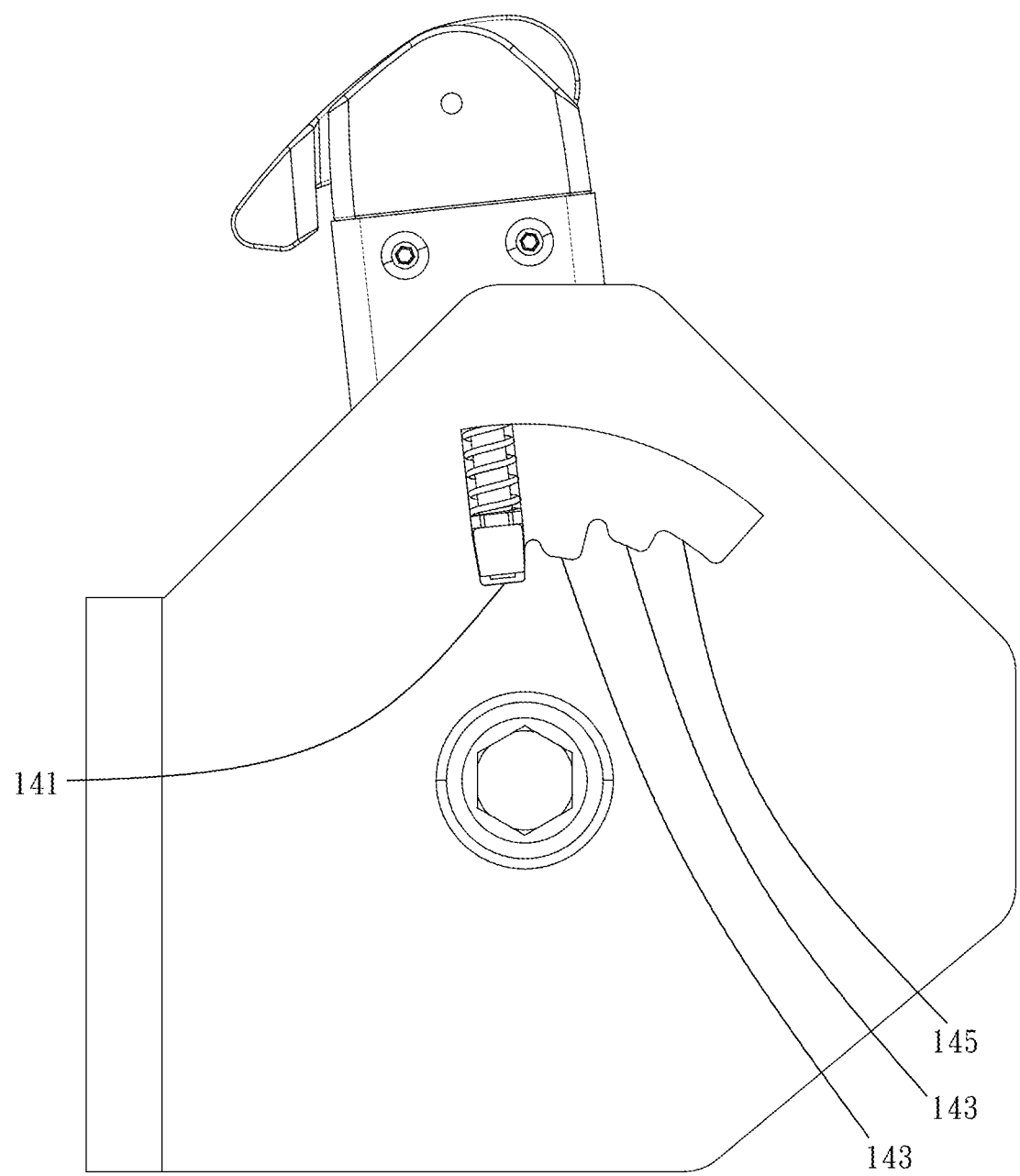
FIG. 12 is a side view of the present invention, showing an alternate form of the guiding hole of the anti-rapid drop joint.

In addition, as shown in FIG. 12, it should be additionally noted that the intermediate positioning groove 143 of the present invention between the standing positioning groove 141 and the inclined positioning groove 145 may be more than one, that is, the intermediate positioning groove 143 between the standing positioning groove 141 and the inclined positioning grooves 145 may be two or more, depending on the stroke between the standing positioning groove 141 and the inclined positioning groove 145.

What is claimed is:

1. An anti-rapid drop joint for bicycle rack, comprising:
 a holder block comprising two upright plates parallel to each other and separated by a predetermined distance, said two upright plates of said holder block respectively having a guiding hole, the said guiding holes of said two upright plates being opposite to each other; and
 a swing assembly pivoted to said two upright plates and located between said two upright plates, said swing assembly comprising a hollow body, a mount, an actuating rod, a handle, an interference member and a spring, said mount being located on said hollow body, said actuating rod passing through said mount and partially extending into said hollow body, said handle being located on said mount and coupled to said actuating rod and operable to move said actuating rod up and down relative to said hollow body, said interference member being located at a bottom of said actuating rod and moving with said actuating rod, said interference member having an interference rod respectively extended from each of two opposite sides thereof, the said two interference rods respectively passing through the said two through holes and extending into the said guiding holes of said two upright plates, said spring having two ends thereof abutting against said interference member and said mount respectively, and the elastic restoring energy of said spring causing said interference member to move downward along with said actuating rod;
 wherein:
 each said guiding hole having a bottom edge, the said bottom edge of each said guiding hole defining a standing positioning groove at a front end, an inclined positioning groove at an opposite rear end and an intermediate positioning groove between said standing positioning groove and said inclined positioning groove, said standing positioning groove, said inclined positioning groove and said intermediate positioning groove each having a groove bottom and a groove wall located at a rear side of said groove bottom;
 the elastic restoring energy of said spring causes said two interference rods to respectively abut to the said groove bottom of one of said standing positioning groove, said inclined positioning groove and said intermediate positioning groove;
 when said two interference rods respectively fit the said standing positioning grooves of said guiding holes, said hollow body is standing;

when said two interference rods respectively fit the said inclined positioning grooves of said guiding holes, said hollow body is inclined.

2. The anti-rapid drop joint for bicycle rack as claimed in claim 1, wherein said hollow body is pivoted to said two upright plates by a pivot and comprises a through hole on each of two opposite sides thereof; said mount being located at a top of said hollow body; said two interference rods respectively pass through said through holes and respectively extend into the said guiding holes of said two upright plates; the said guiding holes of said two upright plates are disposed above said pivot.

3. The anti-rapid drop joint for bicycle rack as claimed in claim 1, wherein said handle is disposed at a top of said actuating rod and forms a grip and a cam on two opposite sides relative to said actuating rod, said cam acting on a top of said mount.

4. The anti-rapid drop joint for bicycle rack as claimed in claim 1, wherein the said groove bottom of each of said standing positioning groove, said inclined positioning groove and said intermediate positioning groove is flat, so that said groove bottom is substantially perpendicular to the associating said groove wall; said interference rods respectively have a flat bottom, and according to the swing position of said hollow body, the elastic restoring energy of said spring causes said two interference rods to respectively abut to the said groove bottom of one of said standing positioning groove, said inclined positioning groove and said intermediate positioning groove.

5. The anti-rapid drop joint for bicycle rack as claimed in claim 1, wherein the said groove wall at the front side of the said groove bottom of said intermediate positioning groove of said guiding hole of each said upright plate is inclined upward with respect to the associating said groove bottom, and the said groove bottom of said inclined positioning groove is adjacent to the topmost edge of the said groove wall of said intermediate positioning groove to form a stepped shape.

6. The anti-rapid drop joint for bicycle rack as claimed in claim 1, wherein each said upright plate comprises a shoulder extended from a top edge of the said guiding hole thereof, and a cover downwardly extended from said shoulder, said cover of each said upright plate being spaced apart from the associating said guiding hole by a predetermined distance and shielding the associating said guiding hole.

7. An anti-rapid drop bicycle rack, comprising:
a connecting rod having a front end thereof adapted for connecting to a connection portion of a car tail;
a holder block comprising two upright plates parallel to each other and separated by a predetermined distance, said two upright plates of said holder block being located at an opposing rear end of said connecting rod and respectively having a guiding hole, the said guiding holes of said two upright plates being opposite to each other; and
a swing assembly pivoted to said two upright plates and located between said two upright plates, said swing assembly being provided with at least one bicycle mounting bracket, said swing assembly comprising a hollow body, a mount, an actuating rod, a handle, an interference member and a spring, said mount being located on said hollow body, said actuating rod passing through said mount and partially extending into said hollow body, said handle being located on said mount and coupled to said actuating rod and operable to move said actuating rod up and down relative to said hollow body, said interference member being located at a bottom of said actuating rod and moving with said actuating rod, said interference member having an interference rod respectively extended from each of two opposite sides thereof, the said two interference rods respectively passing through the said two through holes and extending into the said guiding holes of said two upright plates, said spring having two ends thereof abutting against said interference member and said mount respectively, and the elastic restoring energy of said spring causing said interference member to move downward along with said actuating rod;

wherein:
each said guiding hole having a bottom edge, the said bottom edge of each said guiding hole defining a standing positioning groove at a front end, an inclined positioning groove at an opposite rear end and an intermediate positioning groove between said standing positioning groove and said inclined positioning groove, said standing positioning groove, said inclined positioning groove and said intermediate positioning groove each having a groove bottom and a groove wall located a rear side of said groove bottom;
the elastic restoring energy of said spring causes said two interference rods to respectively abut to the said groove bottom of one of said standing positioning groove, said inclined positioning groove and said intermediate positioning groove;
when said two interference rods respectively fit the said standing positioning grooves of said guiding holes, said hollow body is standing;
when said two interference rods respectively fit the said inclined positioning grooves of said guiding holes, said hollow body is inclined.

8. The anti-rapid drop bicycle rack as claimed in claim 7, wherein said swing assembly further comprises an upright stanchion, said upright stanchion having a bottom end thereof fixedly connected to said hollow body; said at least one bicycle mounting bracket is mounted on an opposite top end of said upright stanchion; said hollow body is pivoted to said two upright plates by a pivot and comprises a through hole on each of two opposite sides thereof; said mount is located at a top of said hollow body; said two interference rods respectively pass through said through holes and respectively extend into the said guiding holes of said two upright plates; the said guiding holes of said two upright plates are disposed above said pivot.

9. The anti-rapid drop bicycle rack as claimed in claim 7, wherein said handle is disposed at a top of said actuating rod and forms a grip and a cam on two opposite sides relative to said actuating rod, said cam acting on a top of said mount.

10. The anti-rapid drop bicycle rack as claimed in claim 7, wherein the said groove bottom of each of said standing positioning groove, said inclined positioning groove and said intermediate positioning groove is flat, so that said groove bottom is substantially perpendicular to the associating said groove wall; said interference rods respectively have a flat bottom, and according to the swing position of said hollow body, the elastic restoring energy of said spring causes said two interference rods to respectively abut to the said groove bottom of one of said standing positioning groove, said inclined positioning groove and said intermediate positioning groove.

11. The anti-rapid drop bicycle rack as claimed in claim 7, wherein the said groove wall at the front side of the said groove bottom of said intermediate positioning groove of said guiding hole of each said upright plate is inclined upward with respect to the associating said groove bottom, and the said groove bottom of said inclined positioning groove is adjacent to the topmost edge of the said groove wall of said intermediate positioning groove to form a stepped shape.

12. The anti-rapid drop bicycle rack as claimed in claim 7, wherein each said upright plate comprises a shoulder extended from a top edge of the said guiding hole thereof, and a cover downwardly extended from said shoulder, said cover of each said upright plate being spaced apart from the associating said guiding hole by a predetermined distance and shielding the associating said guiding hole.

13. The anti-rapid drop bicycle rack as claimed in claim 7, wherein said hollow body is elongated; said at least one bicycle mounting bracket is located on a top of said hollow body.

\* \* \* \* \*